United States Patent
Di Ronza et al.

(10) Patent No.: US 11,053,377 B2
(45) Date of Patent: Jul. 6, 2021

(54) RUBBER COMPOUNDS FOR PNEUMATIC TYRE PARTS COMPRISING LIGNIN AS DISPERSING AGENT

(71) Applicant: BRIDGESTONE CORPORATION, Tokyo (JP)

(72) Inventors: Raffaele Di Ronza, Rome (IT); Claudia Aurisicchio, Rome (IT); Ludovica Caliano, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 26 days.

(21) Appl. No.: 16/477,317

(22) PCT Filed: Jan. 23, 2018

(86) PCT No.: PCT/EP2018/051521
§ 371 (c)(1),
(2) Date: Jul. 11, 2019

(87) PCT Pub. No.: WO2018/138071
PCT Pub. Date: Aug. 2, 2018

(65) Prior Publication Data
US 2020/0032036 A1    Jan. 30, 2020

(30) Foreign Application Priority Data

Jan. 24, 2017 (IT) .................. 102017000007087

(51) Int. Cl.
| | |
|---|---|
| *C08L 97/00* | (2006.01) |
| *C08L 9/06* | (2006.01) |
| *B60C 1/00* | (2006.01) |
| *C08K 3/36* | (2006.01) |

(52) U.S. Cl.
CPC .................. *C08L 9/06* (2013.01); *B60C 1/00* (2013.01); *C08K 3/36* (2013.01); *C08L 97/005* (2013.01)

(58) Field of Classification Search
None
See application file for complete search history.

(56) References Cited

U.S. PATENT DOCUMENTS

| | | | | |
|---|---|---|---|---|
| 9,102,801 | B1* | 8/2015 | Dirk ..................... | C08K 5/315 |
| 2010/0204368 | A1* | 8/2010 | Benko .................. | C08H 6/00 |
| | | | | 524/73 |
| 2014/0066548 | A1* | 3/2014 | Miyazaki ............. | C08L 7/02 |
| | | | | 524/43 |
| 2017/0298192 | A1* | 10/2017 | Samec ................. | C09J 197/005 |

FOREIGN PATENT DOCUMENTS

| | | | | |
|---|---|---|---|---|
| CN | 104877200 | * | 9/2015 | ............. C08K 13/02 |
| EP | 2 433 813 A1 | | 3/2012 | |
| JP | 2010-248282 A | | 11/2010 | |
| WO | 2014/097108 A1 | | 6/2014 | |
| WO | 2015/147165 A1 | | 10/2015 | |

OTHER PUBLICATIONS

Pulkkinen et al., "Preparation and Testing of Cationic Flocculants from Kraft Lignin" ACS Symposium Series; American Chemical Society: Washington, DC, 1989, pp. 284-293. (Year: 1989).*
Jiang et al. "Plane-interface-induced lignin-based nanosheets and its reinforcing effect on styrene-butadiene rubber" eXPRESS Polymer Letters, 8(9), 2014, 619-634. (Year: 2014).*
Machine translation of CN-104877200, translation generated Oct. 2020, 8 pages. (Year: 2020).*
"Novel Lignine Containing Random Solution Styrene Butadiene Compound Vulcanizates," ip.com, Oct. 15, 2009, 12 pgs.
P. Alexy et al., "Application of LignIns in Rubber Compounds", KGK Kautschuk, Gummi, Kunststoffe: International Technical Journal for Polymer Materials, Jan. 1, 2008, pp. 26-32, vol. 61, No. 1.
International Search Report for PCT/EP2018/051521 dated May 9, 2018 (PCT/ISA/210).
Written Opinion of the International Searching Authority for PCT/EP2018/051521 dated May 9, 2018 (PCT/ISA/237).

* cited by examiner

*Primary Examiner* — Robert S Loewe
(74) *Attorney, Agent, or Firm* — Sughrue Mion, PLLC

(57) ABSTRACT

A rubber compound for the preparation of pneumatic tyre parts comprising at least a crosslinkable unsaturated-chain polymer base, a filler, a vulcanization system and a dispersing agent comprising, in turn, a functionalized lignin having a plurality of functionalizations of the general formula I (I)

wherein R and R' are different from each other and chosen from —OH and —OArLig and
n is an integer between 1 and 6.

9 Claims, No Drawings

RUBBER COMPOUNDS FOR PNEUMATIC TYRE PARTS COMPRISING LIGNIN AS DISPERSING AGENT

CROSS REFERENCE TO RELATED APPLICATIONS

This application is a National Stage of International Application No. PCT/EP2018/051521 filed Jan. 23, 2018, claiming priority based on Italian Patent Application No. 102017000007087, filed Jan. 24, 2017.

The present invention relates to the use of functionalized lignin as a dispersing agent for rubber compounds for pneumatic tyre parts.

The usage has long been known of lignin as a dispersing agent within rubber compounds for making pneumatic tyre parts.

Lignin is an organic substance that binds the cells and fibers that constitute wood and the lignified elements of plants. After cellulose, it is the most abundant renewable source of carbon on earth. Although it is not possible to define the precise structure of lignin as a chemical molecule, it is however possible to identify lignin as a polymeric structure based on the following three phenylpropane units: -p-coumaryl alcohol; -coniferyl alcohol (4-hydroxy-3-methoxycinnamyl alcohol); -sinapyl alcohol (4-hydroxy-3,5-dimethoxycinnamyl alcohol). As can easily be inferred from the chemical structure of the basic components of lignin, the latter is particularly rich in hydroxyl groups, mainly of the phenolic, alcohol or carboxylic type, that render the same lignin particularly suitable for functionalization by means of esterification and/or etherification reactions.

There are several lignin extraction processes, including the Kraft process and the Sulphonation process.

Kraft Lignin is a byproduct of the Kraft process that is utilized to chemically extract cellulose from wood. This is obtained by means of precipitation, lowering the pH of spent liquor from the Kraft process. The phenolic, alcohol and carboxyl hydroxyls are the main identifiable functional groups in Kraft lignin, while thiol groups are present to a lesser extent.

Contrary to this, the Sulphonation process leads to the obtaining of a lignin characterized by the presence of hydroxyls and high concentrations of sulphonic groups.

As may immediately be apparent to a person skilled in the art, the usage of lignin represents a significant advantage in terms of sustainability. In fact, lignin is a natural product that constitutes a by-product of wood in the manufacture of paper. In this respect, it should also be specified that the disposal of lignin is a limiting stage within the paper production chain.

It has been experimentally found that the ability of lignin to disperse within a polymeric matrix is strongly influenced by the respective polarities.

As can seem obvious, if the dispersion of the lignin within the polymer base is improved, then consequently the properties of the compound as a whole, such as for example the rolling resistance and the abrasion resistance, are also necessarily improved.

The requirement was therefore felt for a solution that would guarantee an improved dispersion of the lignin in order to allow for more efficient usage thereof.

The object of the present invention is a rubber compound for the preparation of pneumatic tyre parts comprising at least a crosslinkable unsaturated-chain polymer base, a filler, a vulcanization system and a dispersing agent; said compound being characterized in that said dispersing agent comprises a functionalized lignin having a plurality of functionalizations of the general formula I

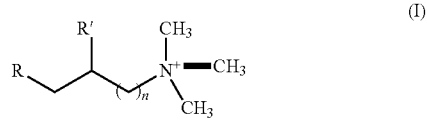

wherein R and R' are different from each other and chosen from —OH and —OArLig and n is an integer between 1 and 6.

Here and hereafter by —OArLig is meant a chemical group bonded to a phenolic hydroxyl of the lignin.

Here and hereinafter, by "crosslinkable unsaturated-chain polymer base" is meant any natural or synthetic non-crosslinked polymer capable of assuming all of the chemical-physical and mechanical characteristics typically assumed by elastomers after crosslinking (vulcanization) with sulfur-based systems.

Here and hereinafter, by vulcanization system is meant a complex of ingredients comprising at least sulfur and accelerating compounds that in the preparation of the compound are added during a final mixing step and have the purpose of promoting the vulcanization of the polymer base once the compound is subjected to a vulcanization temperature.

Preferably, R is —OArLig and R' is —OH.

Preferably, n is between 1 and 5.

Preferably, said functionalized lignin is derived from Kraft lignin.

Preferably, said lignin comprises from 10 to 100% of the functionalized hydroxyl groups according to the general formula (I).

Preferably, said rubber compound comprises silica as a filler.

Preferably, said compound comprises functionalized lignin in an amount of between 2 and 6 phr.

Preferably, said functionalized lignin is derived from Kraft lignin.

Another object of the present invention is a pneumatic tyre portion manufactured with the compound according to the present invention.

Yet a further object of the present invention is a pneumatic tyre comprising a portion manufactured with the compound according to the present invention.

Yet a further object of the present invention is the use of functionalized lignin as a dispersing agent within rubber compounds for the production of pneumatic tyre parts; said functionalized lignin having a plurality of functionalizations of the general formula I

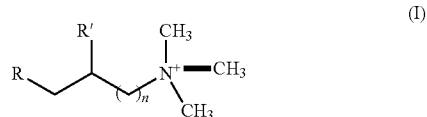

wherein R and R' are different from each other and chosen from —OH and —OArLig and n is an integer between 1 and 6.

For a better understanding of the invention, the following are given as purely illustrative and non-limiting embodiments thereof.

EXAMPLES

Three rubber compounds were manufactured, the first of which (Compound A) represents a comparison compound and does not provide the usage of lignin, the second one (Compound B) represents a further comparison compound and provides the usage of non-functionalized lignin and the third one (Compound C) represents a compound of the invention wherein the usage of functionalized lignin is provided.

The compounds of the examples were prepared according to a standard procedure, which is not relevant to the purposes of the present invention.

Here and hereinafter by "non-productive blending step" is meant a blending step wherein to the crosslinkable unsaturated chain polymer base are added and mixed the ingredients of the compound with the exception of the vulcanization system; while by "productive blending step" is meant a blending step wherein the vulcanization system is added and blended to the compound under preparation.

—Preparation of the Compounds—
(1st Non-Productive Blending Step)

Before the start of the mixing, a mixer with tangential rotors and an internal volume of between 230 and 270 liters was loaded with the polymer base, the silica together with the silane binder, the antioxidant agent and, when provided for, the functionalized lignin or the non-functionalized lignin, reaching a fill factor of 66-72%.

The mixer was operated at a speed of 40-60 rpm, and the mixture thus formed was discharged once a temperature of 145-165° C. had been reached.

(2nd Non-Productive Blending Step)

The mixture obtained from the previous step was reworked in the mixer operated at a speed of 40-60 rpm and subsequently discharged once a temperature of 130-150° C. had been reached.

(Productive Blending Step)

Added to the mixture obtained from the previous step were stearic acid and the vulcanization system composed of sulfur, accelerants and zinc oxide reaching a fill factor of 63-67%.

The mixer was operated at a speed of 20-40 rpm, and the mixture thus formed was discharged once a temperature of 100-110° C. had been reached.

Table I shows the compositions of the Compounds A-C.

TABLE I

| | A | B | C |
|---|---|---|---|
| S-SBR | | 50.0 | |
| E-SBR | | 40.0 | |
| BR | | 10.0 | |
| Silica | | 88.0 | |
| Silane binder | | 11.0 | |
| TMQ | | 0.3 | |
| Lignin | — | 5.0 | — |
| Substituted lignin | — | — | 5.0 |
| Zn oxide | 1.7 | | |
| Sulfur | 1.5 | | |
| DPG | 1.8 | | |
| MBTS | 1.1 | | |
| TBBS | 1.75 | | |
| Stearic acid | 1.0 | | |

E-SBR is a polymer base obtained by means of a polymerization process in emulsion with an average molecular weight ranging respectively between 800-1500×10³ and 500-900×10³, with a styrene content of between 20 to 45% and utilized with an oil content of between 0 and 30%;

S-SBR is a polymer base obtained by means of a polymerization process in solution with an average molecular weight ranging respectively between 800-1500×10³ and 500-900×10³, with a styrene content of between 20 to 45%.

The silica utilized is marketed under the name VN3 by the EVONIK company and has a surface area of about 170 m²/g;

The silane binder utilized is marketed under the name SI75 by the EVONIK company;

TMQ is the acronym for poly(1,2-dihydro-2,2,4-trimethylquinoline) and is used as an antioxidant DPG is the acronym for the compound diphenylguanidine and is used as a vulcanization accelerant;

MBTS is the acronym for the compound Mercaptobenzothiazole disulfide and is used as a vulcanization accelerant;

TBBS is the acronym for N-tert-butyl-2-benzothiazylsulfenamide and is used as a vulcanization accelerant;

The non-functionalized lignin utilized is marketed by Sigma Aldrich under the name of Alkali Lignin.

The following is an illustrative and non-limiting exemplary embodiment of functionalized lignin according to the invention.

Preparation of

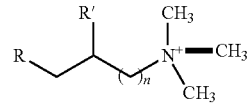

5 gr of Kraft lignin were dissolved in 50 mL of distilled water containing 1 eq of NaOH, calculated on the basis of the quantity of phenolic hydroxyl groups and carboxyl groups.

Once the solubilization of the lignin was complete, the resulting solution was heated to 50° C. in a bath of oil under vigorous agitation.

1 eq of 2,3-epoxypropyltrimethylammonium chloride was added to the solution. The solution was left to react for 4 hours at 50° C., and then cooled to room temperature and acidified to pH 2-3 by means of the addition of hydrochloric acid. The solution was then centrifuged at 5000 rpm for 5 minutes. The solid residue was washed with acidified water and again centrifuged three times in order to remove the sodium chloride and the unreacted reagents. The product was then dissolved in dioxane and lyophilized.

$^{31}$P-NMR was used to verify that the product manufactured as described above has a functionalization of 50% of the phenolic hydroxyls of lignin.

The synthesis procedure described above was repeated utilizing a different quantity of 2,3-epoxypropyltrimethylammonium chloride. In particular, the synthesis was repeated utilizing 0.25 equivalents and 0.50 equivalents of 2,3-epoxypropyltrimethylammonium chloride.

The same synthesis procedures were then repeated utilizing lignin obtained by the Organosolv process rather than Kraft lignin.

From a $^{31}$P-NMR analysis of the products obtained it was possible to verify that when Kraft lignin is utilized the functionalization thereof increases linearly with the quantity of 2,3-epoxypropyltrimethylammonium chloride utilized, while the same thing does not happen with the lignin obtained by the Organosolv process.

The compounds shown in Table I were subjected to a viscosity measurement and, once vulcanized, to a measurement of the rolling resistance, of the silica dispersion index and of the abrasion resistance. In particular, the rolling resistance and the silica dispersion are derived from the dynamic properties of the compound. In fact, the rolling resistance parameter is related to the values of tan δ at 60° C.: the lower the tan δ value at 60° C. the better the resulting rolling resistance; the dispersion index is given by the ratio $100 \times E'/E'_{0.1\% \, strain}$, wherein E' is given by the difference $E'_{0.1\% \, strain} - E'_{4.0\% \, strain}$. The lower the dispersion index, the better the resulting dispersion of the silica within the polymeric matrix.

The viscosity was measured according to the ASTM 1646 standard, the dynamic properties were measured according to the ASTM D5992 standard, the abrasion resistance was measured according to the DIN 53516 standard.

Table II shows the values of the above measurements in indexed form to the values for the comparison Compound A.

TABLE II

|  | A | B | C |
|---|---|---|---|
| Viscosity | 100 | 95 | 100 |
| Dispersion index | 100 | 100 | 91 |
| Rolling resistance | 100 | 100 | 96 |
| Abrasion resistance | 100 | 100 | 105 |

For a more correct evaluation of the values shown in Table II, it should be specified that for the parameters of viscosity, dispersion index and rolling resistance, the lower the corresponding values the more preferable they are; while, for the abrasion resistance parameter the higher the corresponding values the more preferable they are.

From the values shown in Table II it is evident that the presence of functionalized lignin according to the present invention can impart better silica dispersion to the compound, resulting in a better rolling resistance and a better abrasion resistance.

It is also important to note that non-functionalized lignin cannot confer a dispersion of the silica as is instead guaranteed by the presence of functionalized lignin.

Finally, for a more complete evaluation of the present invention, it should be considered that the same allows for the usage of a by-product of the paper industry which otherwise would have to be disposed of, with consequent cost and environmental benefits.

The invention claimed is:

1. Rubber compound for the preparation of pneumatic tyre parts comprising at least one crosslinkable unsaturated-chain polymer base, a filler, a vulcanization system and a dispersing agent;
said compound being characterized in that said dispersing agent comprises a functionalized lignin having a plurality of functionalizations of the general formula I

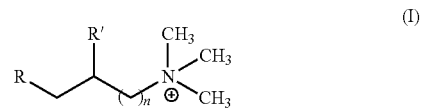

wherein R and R' are different from each other and chosen from —OH and —OArLig and
n is an integer between 1 and 6.

2. Rubber compound according to claim 1, characterized in that R is —OArLig and R' is —OH.

3. Rubber compound according to claim 1, characterized in that n is between 1 and 5.

4. Rubber compound according to claim 1, characterized in that said functionalized lignin is derived from Kraft lignin.

5. Rubber compound according to claim 1, characterized in that said lignin comprises from 10 to 100% of the functionalized hydroxyl groups according to the general formula (I).

6. Rubber compound according to claim 1, characterized in that it comprises silica as a filler.

7. Rubber compound according to claim 1, characterized in that it comprises said functionalized lignin in an amount of between 2 and 6 phr.

8. Pneumatic tyre portion made with the compound according to claim 1.

9. Pneumatic tyre comprising a portion according to claim 8.

* * * * *